(12) United States Patent
Eslami-Nejad et al.

(10) Patent No.: US 11,698,207 B2
(45) Date of Patent: Jul. 11, 2023

(54) SINGLE-PIPE THERMAL ENERGY SYSTEM

(71) Applicant: HIS MAJESTY THE KING IN RIGHT OF CANADA, AS REPRESENTED BY THE MINISTER OF NATURAL RESOURCES, Ottawa (CA)

(72) Inventors: Parham Eslami-Nejad, Saint Hubert (CA); Arash Bastani, Montreal (CA); Daniel Giguere, Longueuil (CA)

(73) Assignee: HIS MAJESTY THE KING IN RIGHT OF CANADA, AS REPRESENTED BY THE MINISTER OF NATURAL RESOURCES, Ottawa (CA)

(*) Notice: Subject to any disclaimer, the term of this patent is extended or adjusted under 35 U.S.C. 154(b) by 671 days.

(21) Appl. No.: 16/528,165

(22) Filed: Jul. 31, 2019

(65) Prior Publication Data
US 2020/0041163 A1     Feb. 6, 2020

Related U.S. Application Data

(60) Provisional application No. 62/712,602, filed on Jul. 31, 2018.

(51) Int. Cl.
*F24F 12/00*     (2006.01)
*F24D 10/00*     (2022.01)
*F24F 3/06*      (2006.01)

(52) U.S. Cl.
CPC ............ *F24F 12/00* (2013.01); *F24D 10/003* (2013.01); *F24F 3/06* (2013.01)

(58) Field of Classification Search
CPC .............. F24D 19/1072; F24D 10/003; F24D 19/1066; F24D 15/04; F24D 2200/123;
(Continued)

(56) References Cited

U.S. PATENT DOCUMENTS

| 3,608,625 A | 9/1971 | Kendrick |
| 5,441,103 A | 8/1995 | Rezkallah et al. |

(Continued)

FOREIGN PATENT DOCUMENTS

| CN | 200952854 Y | 9/2007 |
| CN | 101308050 A | 11/2008 |

(Continued)

OTHER PUBLICATIONS

Extended European Search Report, Reference E109900012, Application No. 19845050.4-1002, dated Mar. 25, 2022.
(Continued)

*Primary Examiner* — Frantz F Jules
*Assistant Examiner* — Martha Tadesse
(74) *Attorney, Agent, or Firm* — Gottlieb, Rackman & Reisman, PC

(57) ABSTRACT

Thermal energy systems for managing, distribution and recovery of thermal energy. A single-pipe loop circulating a two-phase refrigerant is provided. The single-pipe loop is spread through the entire system and interconnects a plurality of local heat exchange stations, each having different thermal energy loads. A central circulation mechanism (CCM) is also provided for circulating the refrigerant for distribution of thermal energy within the system.

14 Claims, 5 Drawing Sheets

(58) Field of Classification Search
CPC  F24D 2200/16; F24D 2220/0292; F24F 3/06; F24F 3/065; F24F 12/00; F24F 2005/0064; F25B 29/003; F24S 20/40
See application file for complete search history.

(56) References Cited

U.S. PATENT DOCUMENTS

| | | | |
|---|---|---|---|
| 5,617,729 A | 4/1997 | Hyman | |
| 6,290,142 B1 * | 9/2001 | Togawa | F02G 5/00 237/12.1 |
| 2010/0018668 A1 | 1/2010 | Favrat et al. | |
| 2012/0279681 A1 | 11/2012 | Vaughan et al. | |
| 2014/0223939 A1 | 8/2014 | Nasuta et al. | |
| 2015/0219365 A1 | 8/2015 | Zaynulin et al. | |
| 2016/0334116 A1 * | 11/2016 | Zaynulin | E03B 7/07 |
| 2017/0138619 A1 | 5/2017 | Sprayberry et al. | |
| 2017/0191711 A1 | 7/2017 | Radcliff et al. | |
| 2018/0156072 A1 * | 6/2018 | Johnson | F01K 25/04 |

FOREIGN PATENT DOCUMENTS

| | | | |
|---|---|---|---|
| CN | 202209817 U | | 5/2012 |
| CN | 102798138 A | | 11/2012 |
| CN | 103256664 A | | 8/2013 |
| CN | 104190490 A | | 12/2014 |
| CN | 105157098 A | | 12/2015 |
| CN | 204987546 U | | 1/2016 |
| CN | 205718040 | * | 11/2016 |
| CN | 206769969 U | | 12/2017 |
| CN | 107630726 A | * | 1/2018 |
| EP | 3029384 A1 | | 6/2016 |
| JP | 58193035 A | | 11/1983 |
| JP | 01234722 A | | 9/1989 |
| JP | 03225125 A | | 10/1991 |
| JP | 2004020191 A | | 1/2004 |
| JP | 2008032376 A | | 2/2008 |
| KR | 101166858 B1 | | 7/2012 |
| WO | 2013128200 A2 | | 9/2013 |
| WO | 2014016456 A1 | | 1/2014 |

OTHER PUBLICATIONS

Wikipedia, "Vapor—Compression Refrigeration". Accessible at https://en.wikipedia.org/wiki/Vapor-compression_refrigeration. Cited in Extended European Search Report dated Mar. 25, 2022.

* cited by examiner

SINGLE-PIPE THERMAL ENERGY SYSTEM

RELATED APPLICATIONS

This application is a non-provisional patent application which claims the benefit of U.S. provisional application No. 62/712,602 filed on Jul. 31, 2018

TECHNICAL FIELD

The present invention relates to the field of thermal energy systems. In particular, the present invention relates to thermal energy systems for distribution and recovery of thermal energy.

BACKGROUND

With global warming affecting the planet, it has become increasingly important to develop greener technologies for our every day needs. To that end, there have been continuous efforts in many technology fields, including in fields such as car technology, manufacturing, household products, etc.

The building sector is a significant contributor to the industrial world's total energy use, particularly due to space heating and cooling, and is thus associated with greenhouse gas emissions and other environmental issues. Because of this, promoting the use of renewable energy sources, energy-efficient systems, improved energy management, and the like in a built environment, has become part of a global strategy towards the development of zero-net energy systems.

Several thermal energy systems have been proposed, most of which demonstrate a number of drawbacks. For example, heat pump technology uses an energy-efficient method used for air conditioning and hot water production. However, it is well known that the performance of such a method is negatively affected when there is a substantial difference between ambient and desired temperature. Low temperature lift heat pumps have been shown to have a significantly improved performance when compared to mainstream air-source or water-source heat pumps. However, their application in buildings is very limited given the temperature ranges commonly required by various thermal energy loads.

A more environmentally friendly measure that minimizes energy use is heat recovery. In networks with simultaneous heating and cooling needs, heat recovery systems can significantly reduce energy waste by removing heat from a thermal zone and reusing it to partially or fully condition another zone. To that end, a thermal network is required which interconnects all the zones, regardless of the physical distance between zones. As of today, the lack of a cost-effective and thermally insulated network is the bottleneck to exploit the full potential of heat recovery.

Other technologies use centralized Heating, Ventilation and Air-Conditioning systems (HVAC). Such centralized systems require large and expensive distribution systems that use a lot of ducting or piping. Decentralized systems that use compact and individualized systems for each thermal zone are advantageous in terms of compactness and convenience. Said decentralized systems may avoid the need for ducting and central units that require lots of space, but such systems are not energy efficient from a thermal energy distribution viewpoint.

There is therefore a need to develop more efficient thermal energy systems that have minimal energy losses, maximum energy recovery between thermal energy loads, and that provide reduced size and costs, while facilitating the integration of renewable energy sources.

An object of the present invention is to thus provide a technology capable of interconnecting renewable thermal energy sources/sinks and all thermal energy loads of a building or a network, regardless of physical distance, for optimal thermal energy management, distribution and recovery.

SUMMARY

The present invention provides thermal energy systems for managing, distribution and recovery of thermal energy, uses the methods thereof. The system of the invention comprises a single-pipe loop circulating a two-phase refrigerant. The single-pipe loop is spread through the entire system and interconnects a plurality of local heat exchange stations, each having different thermal energy loads. A central circulation mechanism (CCM) is also provided for circulating the refrigerant for distribution of thermal energy within the system.

In a first aspect, the present invention provides a thermal energy system for distribution and recovery of thermal energy within the system, the system comprising: a single-pipe loop for circulating a two-phase refrigerant within the system; a central circulation mechanism for circulating the two-phase refrigerant through the single-pipe loop, said central circulation mechanism comprising at least one compressor; and at least two local heat exchange stations, each of said at least two local heat exchange stations comprising at least one local heat exchanger and at least one local thermal unit, and said at least one local heat exchanger being thermally connected to the single-pipe loop and to the at least one local thermal unit for thermal energy exchange therebetween; wherein said central circulation mechanism controls the circulation of the two-phase refrigerant for creating different working pressures in said single-pipe loop and for maintaining the two-phase refrigerant at a substantially constant state and temperature at the end of a circulation cycle through the single-pipe loop; and wherein the thermal energy is distributed and recovered within the system by the two-phase refrigerant.

In a second aspect, the present invention provides use of a thermal energy system comprising: a single-pipe loop for circulation of a two-phase refrigerant; a central circulation mechanism for circulating the two-phase refrigerant through the single-pipe loop, said central circulation mechanism comprises at least one compressor; and at least two local heat exchange stations, each of said at least two local heat exchange stations comprising at least one local heat exchanger and at least one local thermal unit, said one local heat exchanger being thermally connected to the single-pipe loop and the at least one local thermal unit for thermal energy exchange therebetween; wherein said central circulation mechanism controls the circulation of the two-phase refrigerant for creating different working pressures in said single-pipe loop and for maintaining the two-phase refrigerant at a substantially constant state and temperature at the end of a circulation cycle through the single-pipe loop; and wherein the thermal energy is distributed within the system by the two-phase refrigerant; and wherein the use of the system is for distribution and recovery of thermal energy.

In a third aspect, the present invention provides A method for distribution and recovery of thermal energy, the method comprising: providing a thermal energy system in an environment, wherein the thermal energy system comprises: a single-pipe loop for circulation of a two-phase refrigerant; a central circulation mechanism for circulating the two-phase refrigerant through the single-pipe loop, said central circulation mechanism comprises at least one compressor; and at least two local heat exchange stations, each of said at least two local heat exchange stations comprising at least one local heat exchanger and at least one local thermal unit, said one local heat exchanger being thermally connected to the single-pipe loop and the at least one local thermal unit for thermal energy therebetween; circulating the refrigerant within the thermal energy system; controlling the circulation of the refrigerant for distribution and recovery of the thermal energy between said at least two local heat exchange stations; wherein said central circulation mechanism controls the circulation of the two-phase refrigerant for creating different working pressures in said single-pipe loop and for maintaining the two-phase refrigerant at a substantially constant state and temperature at the end of a circulation cycle through the single-pipe loop; and wherein the thermal energy is distributed and recovered within the system by the two-phase refrigerant.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
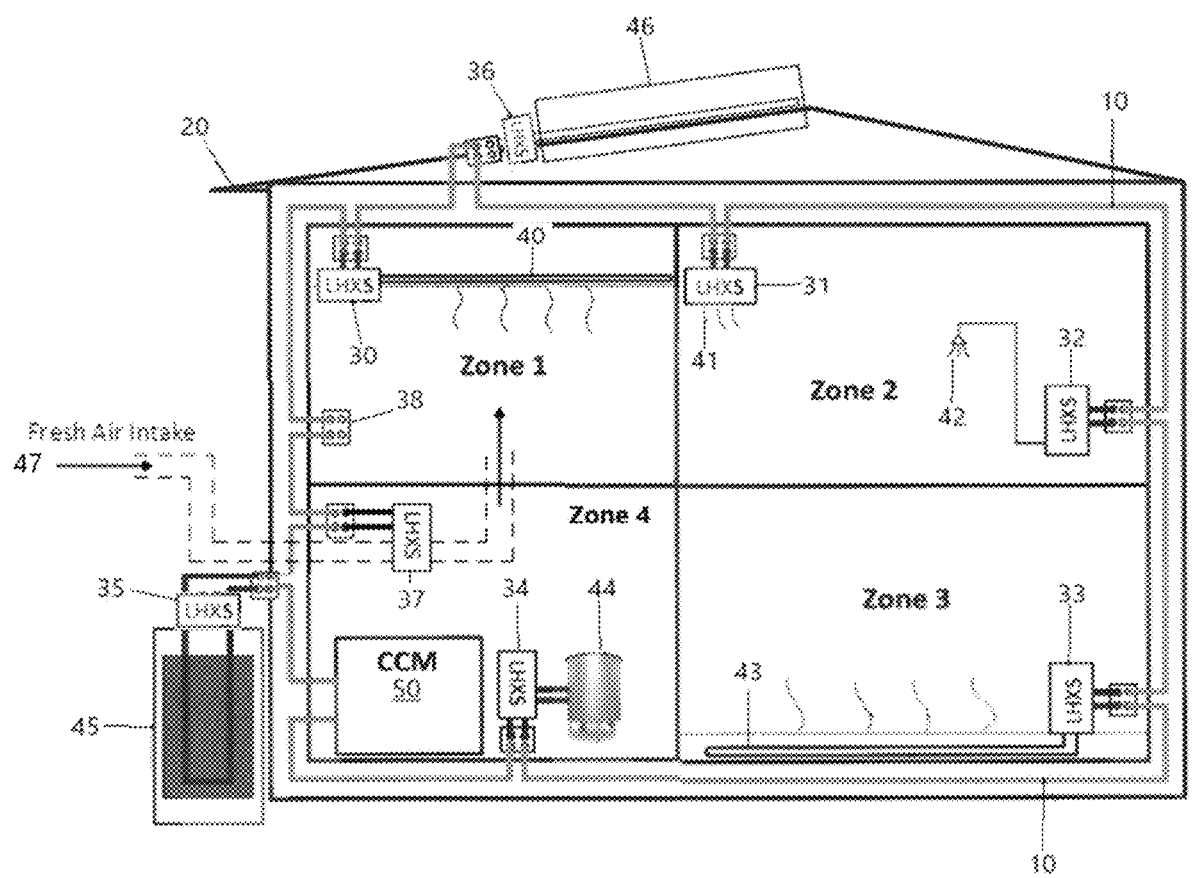
FIG. 1 is a schematic representation of a building equipped with a thermal energy system according to one embodiment of the present invention.

The present invention relates to a thermal energy system for managing, distribution and recovery of thermal energy within the system. The thermal energy system of the present invention is configured for optimal energy management, distribution and recovery to thereby reduce overall energy consumption. Preferably, the thermal energy within the system may be balanced such that there is zero-energy consumption. The system of the present invention may be used inside buildings that have periodic, recurrent, or simultaneous thermal energy loads for heating and cooling. Such buildings may include places such as homes, office buildings, shopping centers, supermarkets, hospitals, hotels, sports complexes, etc. The system may also connect multiple buildings in a network for the management, distribution and recovery of thermal energy therebetween. The system may be installed in new or existing construction projects. The system of the present invention may also be applied to any other construction or facilities in which heating and cooling are required, such as automotive vehicles, electrical vehicles, railroad vehicles, watercrafts, or the like.

The expression "thermal energy load" as used herein is intended to mean any thermal energy demand, rejection, dumping, sink, storage, dissipation, or the like, including internal thermal energy loads, which are located inside a built environment, and external thermal energy loads which are located outside of a built environment for balancing the thermal energy within the system.

The internal thermal energy loads located inside the building environment are usually served with the pressure equivalent to a saturated temperature at the comfort zone, e.g., a range of 17 to 24° C. The external thermal energy loads located outside of the building environment and used to balance the network are usually operating in different pressure/temperature range than the internal thermal loads and, accordingly, free heating/cooling may be possible.

One or more objects of the invention may be achieved by providing a single-pipe loop spread through the entire system. In one embodiment, the single-pipe loop may interconnect a plurality of local heat exchange stations throughout a building, each station having different thermal energy loads. Each local heat exchange station may comprise a heat exchanger and a local thermal unit, the combination of which provides for the thermal energy load at the location of the heat exchange station, i.e. demand, sink, storage, source. The local thermal unit may be any thermal unit known in the art such as a heating/cooling system, a water heating system, etc., any known renewable energy source such as a geothermal system, a solar collector thermal system, an ocean thermal energy system, or the like, or any known thermal energy storage (TES) system such as geothermal system, solar thermal system, sensible heat storage system, latent heat storage system, etc. For example, heating/cooling systems may be a space heating unit, a space cooling unit, a space heating and cooling unit, or a floor heating unit. Examples of the water heating system may include a water heater tank, a tankless water heater, a domestic hot water unit, or the like. The present invention allows for the avoidance of the use of complex ducting systems such as those used to circulate heat or cool from a central heating/cooling system. The local thermal units may each be small decentralized and high efficiency units as these are more versatile for individual needs.

To exchange heat between the stations and the system, the single-pipe loop circulates a refrigerant. Each local heat exchange station may exchange heat between the thermal unit and the refrigerant through the heat exchanger depending on thermal energy loads. For example, when cooling is required, the local heat exchange station may extract heat from a cooling unit and its environment thereof to inject heat to the refrigerant. When heating is demanded, the local heat exchange station may extract heat from the refrigerant to provide such heat to a local heating unit. When overall thermal energy in the system is not balanced, a local heat exchange station may extract heat from the refrigerant to store/sink/dump the extracted heat or may extract heat from outside environment to provide energy to the system. Such renewable energy source and/or energy sink system may compensate for the deficiency or surplus of thermal energy in the system, such that, preferably, the system will have a near zero-energy consumption.

The single-pipe loop provides for circulation of the same fluid stream of refrigerant to all connected local heat exchange stations. Such a system may allow heat from one local unit to be used by another local unit, making full use of all potential thermal energy in the system, with minimal energy loss. The system may also allow for storage or extraction of heat to thereby balance overall thermal energy in the system. To achieve this optimal distribution of thermal energy, the refrigerant is preferably a two-phase heat carrier fluid. The refrigerant of the present invention continuously condenses and evaporates along the loop depending on thermal energy loads across the system in such a way that the state and temperature of the refrigerant remains substantially unchanged at the end of a circulation cycle throughout the complete loop. In one embodiment, the two-phase heat carrier fluid is $CO_2$. Preferably, the two-phase heat carrier fluid is pure $CO_2$ but any proportion thereof is also contemplated. From the above, the thermal energy system of the present invention provides a single-pipe loop that is physically small, has minimal thermal energy loss, and does not require two pipes (e.g., it does not require two pipes for separate inlet and outlet ports or two pipes for separate circulation of gas and liquid refrigerant).

The present invention may use a central circulation mechanism (CCM) for circulating the refrigerant at a constant state and temperature. One role of the CCM is to provide the refrigerant at a proper vapour mass ratio to the various local heat exchange stations within the system. Based on the fluctuations of thermal energy loads within the system, the operating pressure of the refrigerant may need to be continuously adjusted to have free thermal energy exchange with the environment to thermally balance the system. For this purpose, the CCM uses at least one compressor. The compressor allows the refrigerant to be compressed or expanded to the suitable operating pressures to cool/heat freely with the environment to balance the system. Moreover, the CCM feeds the system with the refrigerant at the saturated pressure equivalent to the operating temperature for an internal local heat exchange stations (LHXS). All the circulation occurs through the single-pipe loop connecting all the internal and external LHXSs. Preferably, the operating temperature of the refrigerant exchanging thermal energy with the internal LHXSs is from 17° C. to 24° C. The operation conditions of the thermal energy system of the present invention may thus be controlled and optimized centrally by the CCM. The use of at least one compressor enables management of any thermal load fluctuation by providing different range of operating pressures in the loop. Since the CCM is based on a compression cycle, a secondary loop is not required to balance the thermal energy. Rejection of the thermal energy surplus or extraction of the thermal energy deficiency can be done directly through any sinks or sources around the network (e.g., ground, outside air, solar . . . ).

FIG. 1 is a schematic representation of a building equipped with a thermal energy system according to one embodiment of the present invention. The thermal energy system comprises a single-pipe loop 10 spread in a building 20. A number of local heat exchange stations (LHXS) 30, 31, 32, 33, 34, 35, 36, 37 are located in different zones of the building 20 or external to the building 20. Each LHXS 30, 31, 32, 33, 34, 35, 36, 37 comprises a heat exchanger (not shown) thermally connected to the single-pipe loop 10 and also individually connected to local thermal units 40, 41, 42, 43, 44, 45, 46, 47. LHXS 30 in zone 1 comprises local thermal unit 40 operating as a ceiling cooling unit. In zone 2, LHXS 31 comprises local thermal unit 41 operating as a space heating/cooling subsystem while LHXS 32, also in zone 2, comprises a tankless water heating system and a local thermal unit 42. In zone 3, LHXS 33 is coupled to local thermal unit 43 that operates as a floor heating system. In zone 4, the local thermal unit 44 is a thermal storage tank and is part of LHXS 34. LHXS 35 comprises a local thermal unit 45 which is external to building 20, operating as a ground heat exchanger, with the thermal unit 45 being for capturing heat from the ground and/or for dissipating heat to the ground. External LHXS 36 comprises a local thermal unit 46 operating as a solar panel subsystem for providing a source of energy to the system. Finally, LHXS 37 is shown for direct heating/cooling of the fresh air received through fresh air intake 47. Optionally, one or more zone can comprise a free socket connected to the single-pipe loop 10 for eventual connection to a new LHXS for future needs (illustrated in zone 1 as free socket 38). The central circulation mechanism (CCM) 50 is located in zone 4 and connected to the single-pipe loop 10. Zone 4 is therefore represented herein as a mechanical room, or the like, of the building 20.

Figure 2:
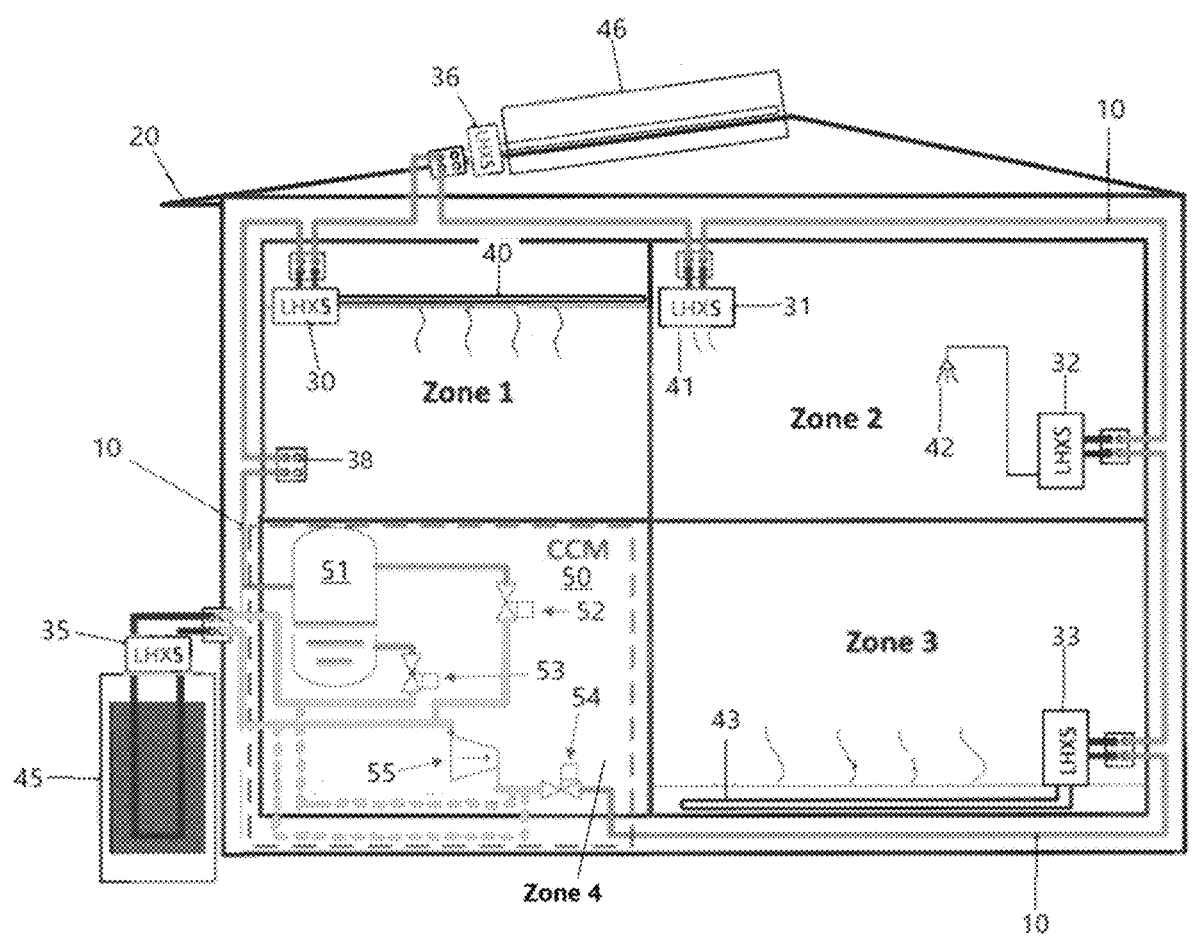
FIG. 2 is a schematic representation of a building equipped with a thermal energy system according to FIG. 1 with amplified central circulation mechanism.

FIG. 2 is a schematic representation of a similar building 20 equipped with a thermal energy system of one embodiment of the present invention, where the role of the central circulation mechanism 50 (CCM) has been amplified. The CCM 50 comprises a reservoir 51 for the two-phase refrigerant and compressor 55 which may operate either in subcritical or supercritical mode. Depending on thermal energy loads, the CCM may operate in two or three working pressure levels, namely a discharge pressure (high pressure) connected to renewable sources to reject a surplus thermal energy of the network shown as a lighter shade of single-pipe loop 10, an intermediate pressure to serve the internal LHXSs shown as a darker shade of single-pipe loop 10, and a suction pressure (low pressure) connected to renewable sources to compensate a deficit of thermal energy inside the loop shown as a lighter shade of single-pipe loop 10. The working pressures are set using three expansion valves 52, 53, 54. Variable capacity compressors can be incorporated into the system to adjust the flow rate of the refrigerant depending on fluctuations in the thermal energy loads. While FIG. 2 only shows one compressor 55, it is to be understood that the thermal energy system can use single-stage multiple compressors or multi-stage multiple compressors, as necessary.

Turning to the LHXSs, it should be clear that different systems may be used. For example, a low temperature lift heat pump unit operating as a secondary loop with a secondary refrigerant may be used. For such a configuration, the heat pump unit would use a heat exchanger connected to the single-pipe loop and connected to the secondary loop for thermal energy exchange therebetween. In one exemplary operation mode, when heating is demanded, the heat exchanger will extract heat from the single-pipe loop to evaporate the secondary refrigerant in the secondary loop. The heat will then be upgraded within the low temperature lift heat pump cycle to higher temperatures required for heating the space or water. It should be clear that very small heat pump units, for example heat pump units of less than a ton in capacity, may also be used to individually serve a single person or a single task. Such heat pump systems known in the art may comprise a compressor, an expansion valve, a condenser and an evaporator.

Other exemplary local heat exchange stations may comprise a direct expansion heat exchange unit, for example an active and passive beam system. Such unit does not have a secondary refrigerant but uses the two-phase refrigerant from the single-pipe loop as a heat exchange medium. In a heating operation mode, the two-phase refrigerant is superheated and compressed to a higher temperature and pressure and is used to release thermal energy to a specific zone.

When thermal energy is released, the two-phase refrigerant is expanded back to the pressure of the single-pipe loop for circulation within the system. Inversely, in a cooling operation mode, the two-phase refrigerant is expanded to a lower pressure and temperature and evaporated by extracting thermal energy from a specific zone to be cooled. After the thermal energy exchange, the two-phase refrigerant is compressed back to the operating pressure of the single-pipe loop to be returned therein. It will be appreciated that the selection of the local heat exchange stations will depend on the needs of each thermal energy system. It should be clear that the number of local heat exchange stations is at least two to provide for distribution and recovery of thermal energy, but is preferably more than two, up to an acceptable limit of the system. The number of local heat exchange stations and their nature can be modified at any moment according to changes in thermal energy needs.

Figure 3:
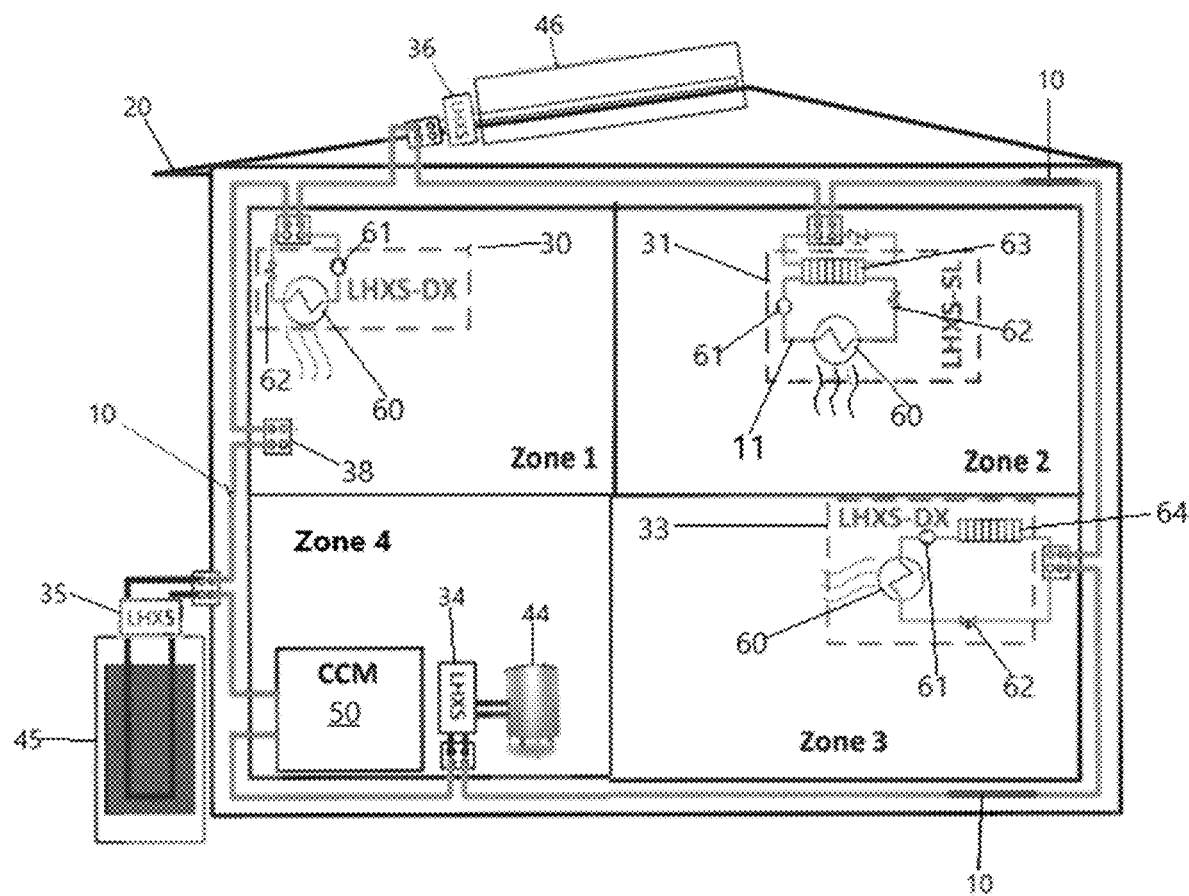
FIG. 3 is a schematic representation of a building equipped with a thermal energy system illustrating exemplary local heat exchange stations according to one embodiment of the present invention.

An exemplary system comprising a number of low temperature lift heat pump units operating as local heat exchange stations in conjunction with direct expansion heat exchange units is shown on FIG. 3. Local heat exchange stations 30 and 33 are shown as direct expansion heat exchange units and local heat exchange station 31 is shown as a low temperature lift heat pump unit. The direct expansion heat exchange unit 30 comprises a heat exchanger 60 for exchanging thermal energy between the two-phase refrigerant and the environment. A compressor 61 and a valve 62 are also shown. The valve 62 is for expansion of the two-phase refrigerant. The compressor 61 is for compression of the two-phase refrigerant back to the operating pressure of the single-pipe loop. Local heat exchange station 31 comprises a secondary loop 11 for circulating a secondary refrigerant. In zone 2, heat exchanger 63 is for exchanging thermal energy between the refrigerant in the single-pipe loop and the secondary refrigerant in the secondary loop. Also shown is a heat exchanger 60 for exchanging thermal energy between the secondary refrigerant and the environment, a compressor 61 and a valve 62 are also shown. In zone 3, a further heat exchanger 64 is also provided for this direct expansion system to provide a superheated two-phase refrigerant with suitable suction for compressor 61.

Figure 4:
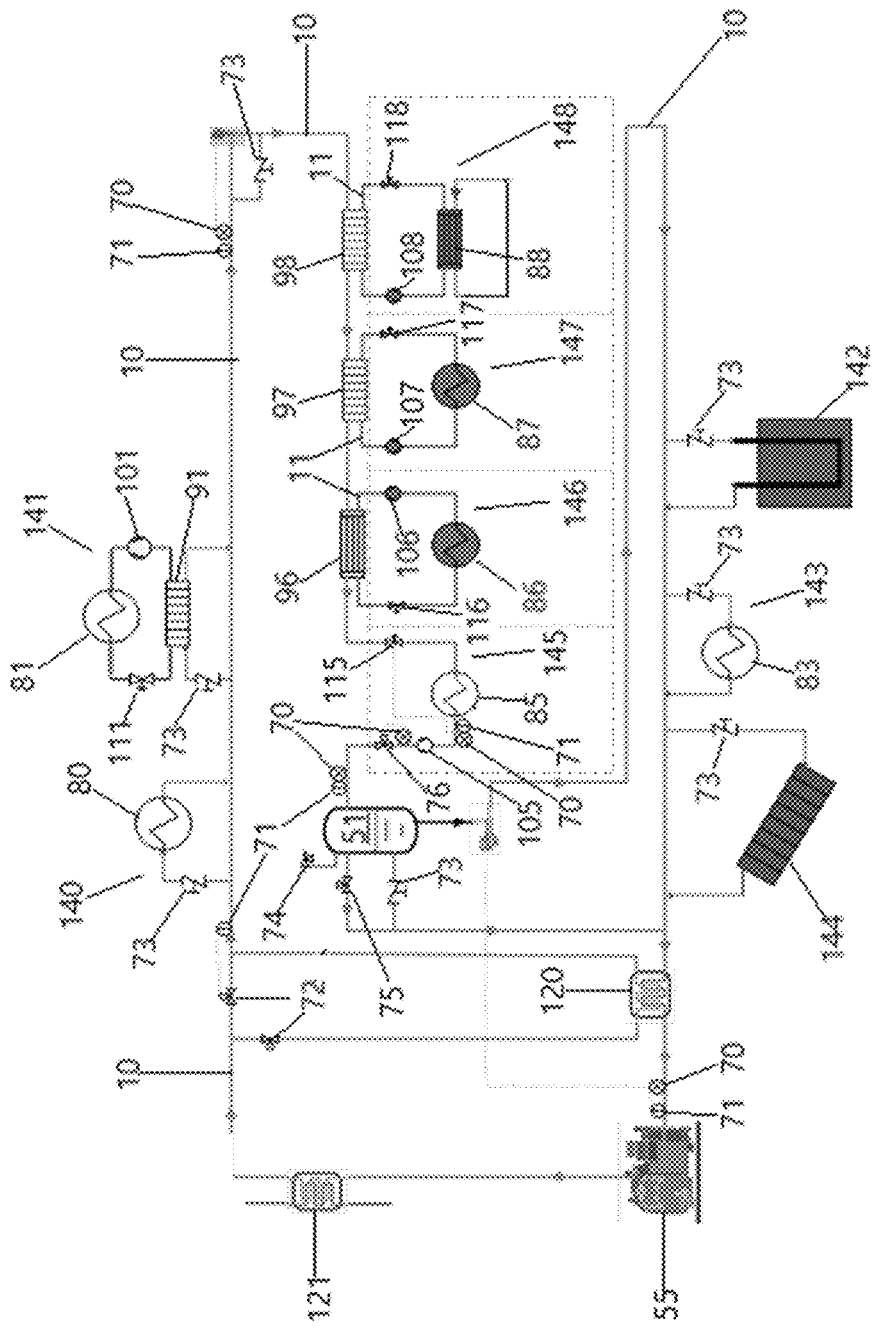
FIG. 4 is a schematic representation of a thermal energy system according to another embodiment of the present invention.

FIG. 4 shows another exemplary representation according to another embodiment of a thermal energy system of the present invention. In this embodiment, the system is not necessarily installed in a building and it will be appreciated that the exemplary thermal energy system illustrated can be used in any construction having various thermal energy needs and can be modified accordingly. Multiple local heat exchange stations have been shown for exemplary purposes, but the number of stations can be adjusted according to what is needed. The single-pipe loop 10 is equipped with various sensors 70 (pressure sensors) and 71 (temperature sensors), and valves 72 (valves with actuator), 73 (stop check valve) and 74 (relief valve for safety purposes) for managing and controlling the flow of refrigerant in the system, for example in each local heat exchange station. A flash valve 75 is shown downstream of a refrigerant reservoir 51 and an expansion valve 76 is shown upstream of the refrigerant reservoir to control the discharge pressure of a compressor 105. The refrigerant reservoir 51 is shown connected to the compressor 55 through an internal heat exchanger 120 to provide a superheated two-phase refrigerant to the compressor 55. A further internal heat exchanger 121 is provided downstream of the compressor 55 to recover the surplus thermal energy at the discharge of the compressor 55 (if required) and to store the thermal energy. Various local heat exchange stations are illustrated: a free cooling unit 140 and a low temperature lift heat pump cooling unit 141 to cool the network to thereby balance a surplus thermal energy in the single-pipe loop 10 if required, a ground source heating energy source unit 142, a free heating unit 143 and an energy source unit 144 to freely heat the network to balance a deficit of thermal energy in the single-pipe loop 10 if required, a direct expansion cooling unit 145, low temperature lift heat pump heating/cooling units 146, 147, 148 to cool and heat inside the built environment. In some local heat exchange stations, heat exchangers 80, 81, 83 are present to exchange of thermal energy with the external environment, and 85, 86, 87, 88 are present for exchange of thermal energy with the inside of a built environment, at the location where each local heat exchange station is placed. Other heat exchangers 91, 96, 97, 98 are illustrated for thermal energy exchange between the single-pipe loop 10 refrigerant and a secondary refrigerant of a secondary loop 11 in low temperature lift heat pump units. Local compressors 101, 105, 106, 107, 108 and expansion valves 111, 115, 116, 117, 118 are illustrated when required in local heat exchange stations.

EXAMPLES

Simulation Results of an Office Building

To exemplify the capacity of the system according to one aspect of the invention, a case study was designed that replicates an office building in Montreal with simultaneous heating and cooling demands. The office consists of five thermal zones: one core zone and four perimeter zones named according to their orientations. The building was simulated in TRNSYS to calculate the annual load profile of each zone. Thermal load specifications of the simulated office are presented in Table 1.

TABLE 1

Thermal Load specifications of the simulated office building

| | West Zone | | East Zone | | North Zone | | South Zone | | Core Zone | |
|---|---|---|---|---|---|---|---|---|---|---|
| | Heating | Cooling | Heating | Cooling | Heating | Cooling | Heating | Cooling | Heating | Cooling |
| Total demand [kWh] | 1944.23 | 3124.15 | 1749.29 | 3090.21 | 2833.39 | 4236.46 | 2085.00 | 5713.57 | 928.38 | 6903.73 |
| Peak load [kW] | 3.32 | 4.41 | 3.31 | 3.98 | 5.28 | 3.69 | 5.14 | 4.67 | 4.26 | 4.10 |

Figure 5:
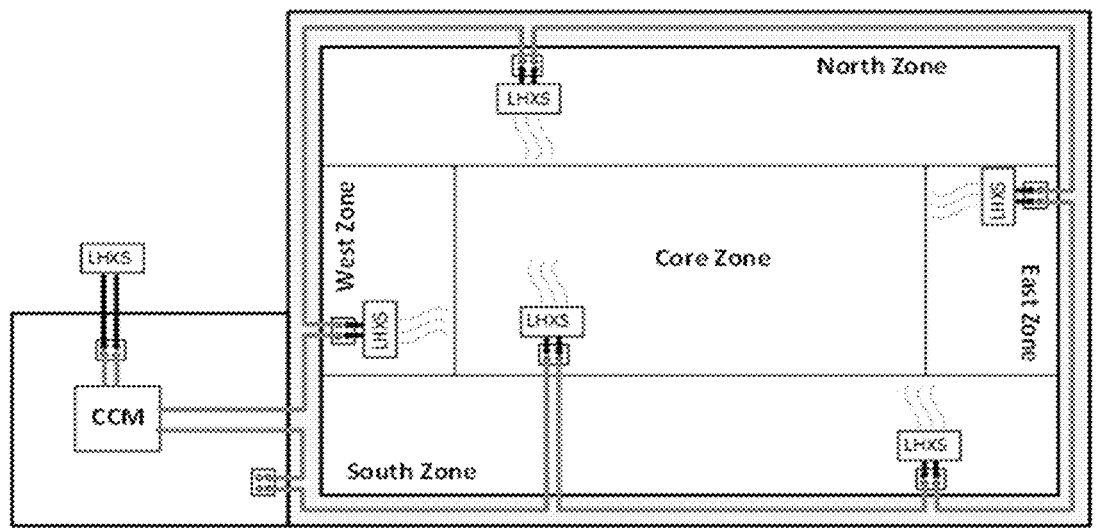
FIG. 5 is a schematic representation of a simulation of an exemplary thermal energy system according to an embodiment of the present invention.

The office equipped with the single-pipe thermal energy network according to one aspect of the invention is schematically presented in FIG. 5. It should be noted that the drawing is not to scale and that the details of the building envelope have not been presented. In the case study, the two-phase heat carrier fluid is pure $CO_2$. As explained above, this is a natural refrigerant with many environmental and economical advantages.

A detailed quasi-steady model simulating the performance of the system was developed using Matlab™. For this model, the following inputs were used:
  Hourly load profile of each thermal zone
  Coefficient of Performance (COP) and capacity of the internal LHXS
  Compressor displacement volume
  Heat exchangers' efficiency of the outdoor LHXSs
  Outdoor temperature The capacity of the compressor was selected appropriately to address the full load of the building. Moreover, the compressor was selected to operate in both subcritical and supercritical modes with 5° C. superheat. Each internal LHXS was sized according to the peak load of the assigned thermal zone. To quantify the performance of the system, overall COP was calculated. This overall COP presents the ratio of the total delivered thermal energy over the total consumed energy along a year using the following equation:

$$\text{Overall } COP = \frac{\sum_{t=0}^{8760} Q_{internal\,LHXS}(t)}{\sum_{t=0}^{8760} (W_{compressor}(t) + W_{internal\,LHXS}(t))}$$

Figure 6:
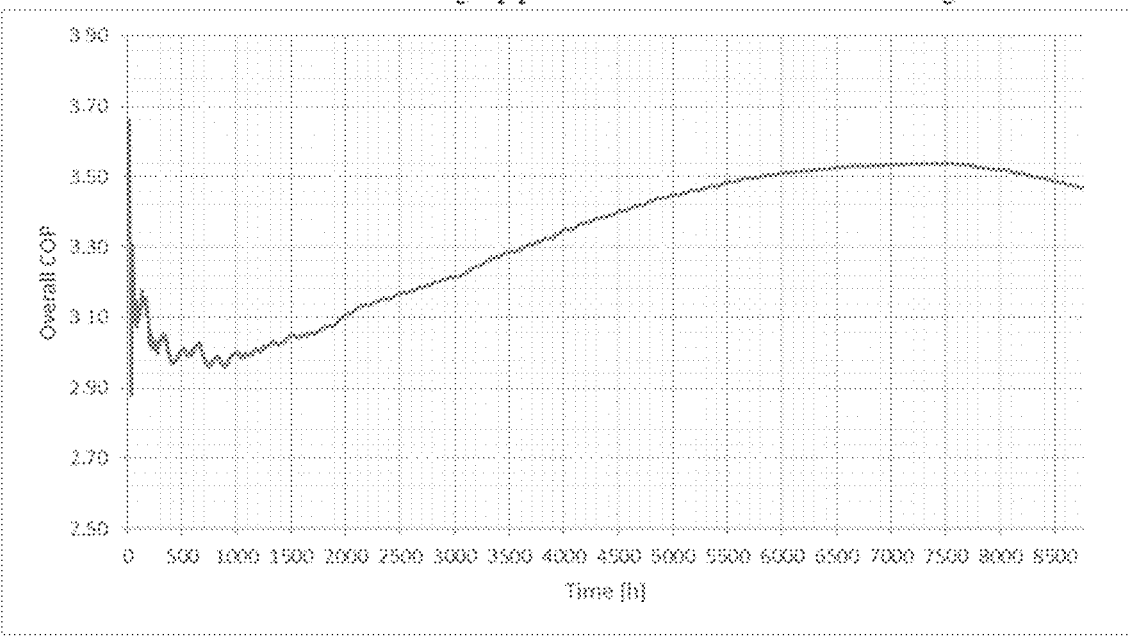
FIG. 6 is a graph of the annual overall Coefficient of Performance of the simulated exemplary thermal energy system according to an embodiment of the present invention.

The overall COP of the system in the entire simulated year is presented in FIG. 6. It is worth mentioning that the results are exemplary and may vary according to various factors such as the load profiles, selected refrigerant, weather condition, duration of simultaneous heating and cooling, and the performance of the indoor LHXS.

A person understanding this invention may now conceive of alternative structures and embodiments or variations of the above all of which are intended to fall within the scope of the invention as defined in the claims that follow.

What is claimed is:

1. A thermal energy system for distribution and recovery of thermal energy within the system, the system comprising:
   a) a single-pipe loop for circulating a two-phase refrigerant within the system;
   b) a central circulation mechanism for circulating the two-phase refrigerant through the single-pipe loop, said central circulation mechanism comprising a reservoir for said two-phase refrigerant, at least one compressor, and a plurality of expansion valves, said at least one compressor being at least one of: single-stage or multi-stage; and
   c) at least three local heat exchange stations, each of said at least three local heat exchange stations comprising at least one local heat exchanger and at least one local thermal unit, said at least one local heat exchanger forming a portion of the single-pipe loop and said at least one local heat exchanger being thermally connected to the at least one local thermal unit for thermal energy exchange between said two-phase refrigerant and said at least one local thermal unit; wherein at least one of said at least three local heat exchange stations is an internal unit for independently heating or cooling at least one zone of a built environment; wherein at least one of said at least three local heat exchange stations is an external unit connected to a thermal sink; wherein at least one of said at least three local heat exchange stations is a further external unit connected to a thermal source; wherein said central circulation mechanism controls at least one of: a temperature or a pressure of the two-phase refrigerant in said single-pipe loop to thereby control a circulation of the two-phase refrigerant for creating different working pressures in said single-pipe loop and for maintaining the two-phase refrigerant at a substantially constant state and temperature at an end of a circulation cycle through the single-pipe loop; wherein control of said temperature or said pressure of said two-phase refrigerant in said single-pipe loop is for thermally balancing said single-pipe loop; and wherein the thermal energy is distributed and recovered within the system by the two-phase refrigerant.

2. The thermal energy system of claim 1, wherein the two-phase refrigerant continuously condenses and evaporates within the single-pipe loop upon thermal energy exchange with at least one of said at least three local heat exchange stations.

3. The thermal energy system of claim 1, wherein the internal unit is at least one of a heating system, a cooling system, a heating and cooling system, or a water heating system.

4. The thermal energy system of claim 1, wherein the thermal energy in the system is balanced.

5. The thermal energy system of claim 1, wherein each of the external units is at least one of a ground heat exchanger, a solar thermal collector, an air cooler, an air heater or an energy storage system.

6. The thermal energy system of claim 1, wherein balancing thermal energy is accomplished by at least one of: storing energy, compensating for energy loss, or energy release of energy surplus.

7. The thermal energy system of claim 1, wherein the system is for distribution and recovery of thermal energy in one of: a building, at least two buildings, an automotive vehicle, a railroad vehicle, an electrical vehicle or a waterborne vehicle.

8. The thermal energy system of claim 1, wherein said at least three local heat exchange stations are each located in different discrete locations in said built environment.

9. The thermal energy system of claim 1, wherein the internal unit is located in a building.

10. Use of a thermal energy system comprising:
   a) a single-pipe loop for circulating a two-phase refrigerant within the system;
   b) a central circulation mechanism for circulating the two-phase refrigerant through the single-pipe loop, said central circulation mechanism comprising a reservoir for said two-phase refrigerant, at least one compressor, and a plurality of expansion valves, said at least one compressor being at least one of: single-stage or multi-stage; and
   c) at least three local heat exchange stations, each of said at least three local heat exchange stations comprising at least one local heat exchanger and at least one local thermal unit, said at least one local heat exchanger forming a portion of the single-pipe loop and said at least one local heat exchanger being thermally connected to the at least one local thermal unit for thermal energy exchange between said two-phase refrigerant and said at least one local thermal unit; wherein at least one of said at least three local heat exchange stations is an internal unit for independently heating or cooling at least one zone of a built environment; wherein at least one of said at least three local heat exchange stations is an external unit connected to a thermal sink; wherein at least one of said at least three local heat exchange stations is a further external unit connected to a thermal source; wherein said central circulation mechanism controls at least one of: a temperature or a pressure of the two-phase refrigerant in said single-pipe loop to thereby control a circulation of the two-phase refrigerant for creating different working pressures in said single-pipe loop and for maintaining the two-phase refrigerant at a substantially constant state and temperature at an end of a circulation cycle through the single-pipe loop; wherein control of said temperature or said pressure of said two-phase refrigerant in said single-pipe loop is for thermally balancing said single-pipe loop; wherein the thermal energy is distributed and recovered within the system by the two-phase refrigerant; and wherein the use of the system is for distribution and recovery of thermal energy.

11. The use of claim 10, wherein the use of the system eliminates re-heating energy consumption.

12. The use of claim 10, wherein the use of the system for distribution and recovery of thermal energy is for use within one of: a building, at least two buildings, an automotive vehicle, a railroad vehicle, an electrical vehicle or a water-borne vehicle.

13. A method for distribution and recovery of thermal energy, the method comprising:
   a) providing a thermal energy system, wherein the thermal energy system comprises:
      a single-pipe loop for circulation of a two-phase refrigerant;
      a central circulation mechanism for circulating the two-phase refrigerant through the single-pipe loop, said central circulation mechanism comprising a reservoir for said two-phase refrigerant, at least one compressor, and a plurality of expansion valves, said at least one compressor being at least one of: single-stage or multi-stage; and
      at least three local heat exchange stations, each of said at least three local heat exchange stations comprising at least one local heat exchanger and at least one local thermal unit, said at least one local heat exchanger forming a portion of the single-pipe loop and said at least one local heat exchanger being thermally connected to the at least one local thermal unit for thermal energy exchange between said two-phase refrigerant and said at least one local thermal unit;
   wherein at least one of said at least three local heat exchange stations is an internal unit for independently heating or cooling at least one zone of a built environment;
   wherein at least one of said at least three local heat exchange stations is an external unit connected to a thermal sink;
   wherein at least one of said at least three local heat exchange stations is a further external unit connected to a thermal source;
      b) circulating the refrigerant within the thermal energy system;
      c) controlling the circulation of the refrigerant for distribution and recovery of the thermal energy between said at least three local heat exchange stations;
   wherein said central circulation mechanism controls at least one of: a temperature or a pressure of the two-phase refrigerant in said single-pipe loop to thereby control a circulation of the two-phase refrigerant for creating different working pressures in said single-pipe loop and for maintaining the two-phase refrigerant at a substantially constant state and temperature at an end of a circulation cycle through the single-pipe loop;
   wherein control of said temperature or said pressure of said two-phase refrigerant in said single-pipe loop is for thermally balancing said single-pipe loop; and
   wherein the thermal energy is distributed and recovered within the system by the two-phase refrigerant.

14. The method of claim 13, wherein the built environment is one of: a building, at least two buildings, an automotive vehicle, a railroad vehicle, an electrical vehicle or a water-borne vehicle.

* * * * *